(12) United States Patent
Garrett et al.

(10) Patent No.: US 10,933,807 B2
(45) Date of Patent: Mar. 2, 2021

(54) VISUAL HAZARD AVOIDANCE THROUGH AN ON-ROAD PROJECTION SYSTEM FOR VEHICLES

(71) Applicant: International Business Machines Corporation, Armonk, NY (US)

(72) Inventors: Tynan J. Garrett, Poughkeepsie, NY (US); Andrew Hicks, Wappingers Falls, NY (US); Michael P. Lyons, Poughkeepsie, NY (US); Miles C. Pedrone, Wappingers Falls, NY (US); Yunli Tang, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/202,645

(22) Filed: Nov. 28, 2018

(65) Prior Publication Data
US 2020/0164796 A1    May 28, 2020

(51) Int. Cl.
*B60Q 9/00* (2006.01)
*G08G 1/16* (2006.01)

(52) U.S. Cl.
CPC ............. *B60Q 9/008* (2013.01); *G08G 1/165* (2013.01); *B60Q 2400/00* (2013.01)

(58) Field of Classification Search
CPC ..... B60Q 9/008; B60Q 2400/00; G08G 1/165
See application file for complete search history.

(56) References Cited

U.S. PATENT DOCUMENTS

| 4,074,227 A | 2/1978 | Kalmus |
| 5,687,249 A * | 11/1997 | Kato ..................... G08G 1/017 340/936 |
| 6,380,849 B1 | 4/2002 | Eckstine et al. |
| 7,421,334 B2 | 9/2008 | Dahlgren et al. |

(Continued)

FOREIGN PATENT DOCUMENTS

| CN | 203420241 U | * | 2/2014 |
| JP | 2012128870 A | * | 7/2012 |
| WO | 2016088067 A2 |   | 6/2016 |

OTHER PUBLICATIONS

"Safety Guideline for the Projectors with Laser Device as Light Source"; Japan Business Machine and Information System Industries Association; 1st Edition; Sep. 2013; 43 Pages.

(Continued)

*Primary Examiner* — Rufus C Point
(74) *Attorney, Agent, or Firm* — Cantor Colburn LLP; Teddi Maranzano (57) ABSTRACT

A method for visual hazard avoidance of a road hazard is provided. The visual hazard avoidance is implemented by an on-road projection system, which is integrated into a vehicle. The on-road projection system includes a projector and a computing device. The on-road projection system implements the method while the vehicle is in motion. The computing device causes the projector to generate a projection on a road as the vehicle is approaching the road hazard. Note that the projection identifies a tire path of the vehicle. The computing device also causes the projector to terminate the projection on the road once the road hazard in passed.

17 Claims, 8 Drawing Sheets

(56) References Cited

U.S. PATENT DOCUMENTS

| | | | |
|---|---|---|---|
| 7,629,899 B2* | 12/2009 | Breed | G08G 1/163 340/903 |
| 7,633,383 B2 | 12/2009 | Dunsmoir et al. | |
| 7,899,621 B2 | 3/2011 | Breed et al. | |
| 7,980,782 B2* | 7/2011 | Bleiner | G08G 1/096716 404/9 |
| 9,845,043 B1* | 12/2017 | Webb | B60W 50/0098 |
| 10,134,280 B1* | 11/2018 | You | B60Q 1/34 |
| 2002/0176608 A1* | 11/2002 | Rose | G01C 7/04 382/108 |
| 2004/0107042 A1 | 6/2004 | Seick | |
| 2007/0257781 A1 | 11/2007 | Denson | |
| 2009/0002193 A1* | 1/2009 | Cemper | G08G 1/096783 340/901 |
| 2009/0097038 A1* | 4/2009 | Higgins-Luthman | B60G 17/019 356/602 |
| 2009/0140887 A1 | 6/2009 | Breed et al. | |
| 2011/0060478 A1 | 3/2011 | Nickolaou | |
| 2012/0044090 A1* | 2/2012 | Kahler | B60Q 1/50 340/905 |
| 2012/0169513 A1* | 7/2012 | Szczerba | G08G 1/166 340/905 |
| 2013/0054089 A1* | 2/2013 | Nordbruch | G08G 1/167 701/36 |
| 2013/0144521 A1* | 6/2013 | Mathieu | G06K 9/00791 701/410 |
| 2014/0028980 A1* | 1/2014 | Othmer | G01C 21/365 353/14 |
| 2014/0049405 A1* | 2/2014 | Breuer | G01N 21/35 340/905 |
| 2014/0092134 A1* | 4/2014 | Nagasawa | B60R 1/00 345/633 |
| 2014/0267415 A1* | 9/2014 | Tang | G08G 1/166 345/633 |
| 2014/0268353 A1* | 9/2014 | Fujimura | G02B 27/01 359/630 |
| 2014/0362195 A1* | 12/2014 | Ng-Thow-Hing | G06K 9/00335 348/51 |
| 2014/0362600 A1* | 12/2014 | Suckling | F21S 41/143 362/583 |
| 2015/0179066 A1* | 6/2015 | Rider | G08G 1/166 701/31.5 |
| 2015/0348388 A1* | 12/2015 | Teller | B60Q 1/2611 340/937 |
| 2016/0009276 A1 | 1/2016 | Moeller | |
| 2016/0034771 A1* | 2/2016 | Schamp | B60G 17/019 348/148 |
| 2016/0207443 A1* | 7/2016 | Widdowson | B60Q 1/0011 |
| 2017/0072843 A1* | 3/2017 | Lection | B60Q 1/50 |
| 2017/0076599 A1* | 3/2017 | Gupta | B60C 9/00 |
| 2017/0089710 A1* | 3/2017 | Slusar | G01C 21/3602 |
| 2017/0174129 A1* | 6/2017 | Chin | G08G 1/166 |
| 2017/0176990 A1* | 6/2017 | Keller | G01S 17/42 |
| 2017/0182934 A1* | 6/2017 | Arita | G06T 7/70 |
| 2018/0004020 A1* | 1/2018 | Kunii | B60Q 1/04 |
| 2018/0056854 A1* | 3/2018 | Kunii | G08G 1/096725 |
| 2018/0126897 A1* | 5/2018 | Hamada | B60Q 1/18 |
| 2018/0186283 A1* | 7/2018 | Fischer | G07C 5/008 |
| 2019/0061611 A1* | 2/2019 | Dellock | G08G 1/096775 |
| 2019/0118705 A1* | 4/2019 | Yu | G08G 1/166 |
| 2019/0139414 A1* | 5/2019 | Morimura | G08G 1/096716 |

OTHER PUBLICATIONS

Authors et al.; "Accident Avoidance Through Risk Management"; An IP.com Prior Art Database Technical Disclosure; IPCOM000224782D; Jan. 3, 2013; 5 pages.

Authors et al.; "Dynamic Project Road Marking Method and Apparatus"; An IP.com Prior Art Database Technical Disclosure; IPCOM000206450D; Apr. 27, 2011; 5 Pages.

Martinez; "Ford's Fusion Sport Helps Jump Potholes"; The Detroit News; Feb. 17, 2016; 2 Pages.

\* cited by examiner

VISUAL HAZARD AVOIDANCE THROUGH AN ON-ROAD PROJECTION SYSTEM FOR VEHICLES

BACKGROUND

The disclosure relates generally to projection systems for vehicles, and more specifically, to a visual hazard avoidance through an on-road projection system for vehicles.

In general, vehicle maintenance and repair can be expensive. Maintenance and repair of vehicles can result from a vehicle encountering poor road conditions. For example, a vehicle that comes into contact with road depressions from manholes and/or potholes can damage to its suspension system. Maintenance and repair of a suspension system is expensive. It has been estimated that pothole damage alone costs U.S. drivers $3 billion annually in vehicle repairs.

A way to avoid damage from a vehicle encountering poor road conditions is for a driver to steer around these conditions. However, precise steering of this kind can be challenging when you need to remain safely in your lane, weather conditions prevent visibility, and/or the poor road conditions are of a size that is comparable to a distance between the inside edges of vehicle tires. At present, there is no way of determining and/or estimating whether a vehicle will encounter poor road conditions, and providing feedback relating to the same.

SUMMARY

According to one or more embodiments, a method for visual hazard avoidance of a road hazard is provided. The visual hazard avoidance is implemented by an on-road projection system, which is integrated into a vehicle. The on-road projection system includes a projector and a computing device. The on-road projection system implements the method while the vehicle is in motion. The computing device causes the projector to generate a projection on a road as the vehicle is approaching the road hazard. Note that the projection identifies a tire path of the vehicle. The computing device also causes the projector to terminate the projection on the road once the road hazard in passed.

According to one or more embodiments, the above method can be implemented as a system and/or computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as discussed above, there is presently no way of determining and/or estimating whether a vehicle directly will encounter poor road conditions, and providing feedback relating to those determinations and estimations. At best, current solutions aggregate road hazard data in a database and warn drivers about upcoming road hazards; however, these solutions do not inform drivers about a vehicle's relative position to the road hazards or provide enough information for drivers to make informed decisions about how to avoid these road hazards.

Turning now to an overview of the aspects of the invention, one or more embodiments of the invention address the above-described shortcomings of the prior art by providing visual hazard avoidance through an on-road projection system, method, and/or computer program product (herein the on-road projection system) for vehicles. For example, the on-road projection system provides visual feedback of tire position parallel to the direction of travel, which enhances a driver's ability to precisely steer around road hazards, such as potholes, uneven pavement, rumble strips, speed bumps, etc. The on-road projection system can be integrated into a vehicle during manufacturing or be attached and calibrated to a vehicle after market. Technical effects and benefits include providing real-time information to drivers to enabling avoiding these road hazards. Thus, embodiments described herein are necessarily rooted in one or more processors of the on-road projection system to perform proactive operations to overcome problems specifically arising in the realm of vehicle maintenance and repair.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
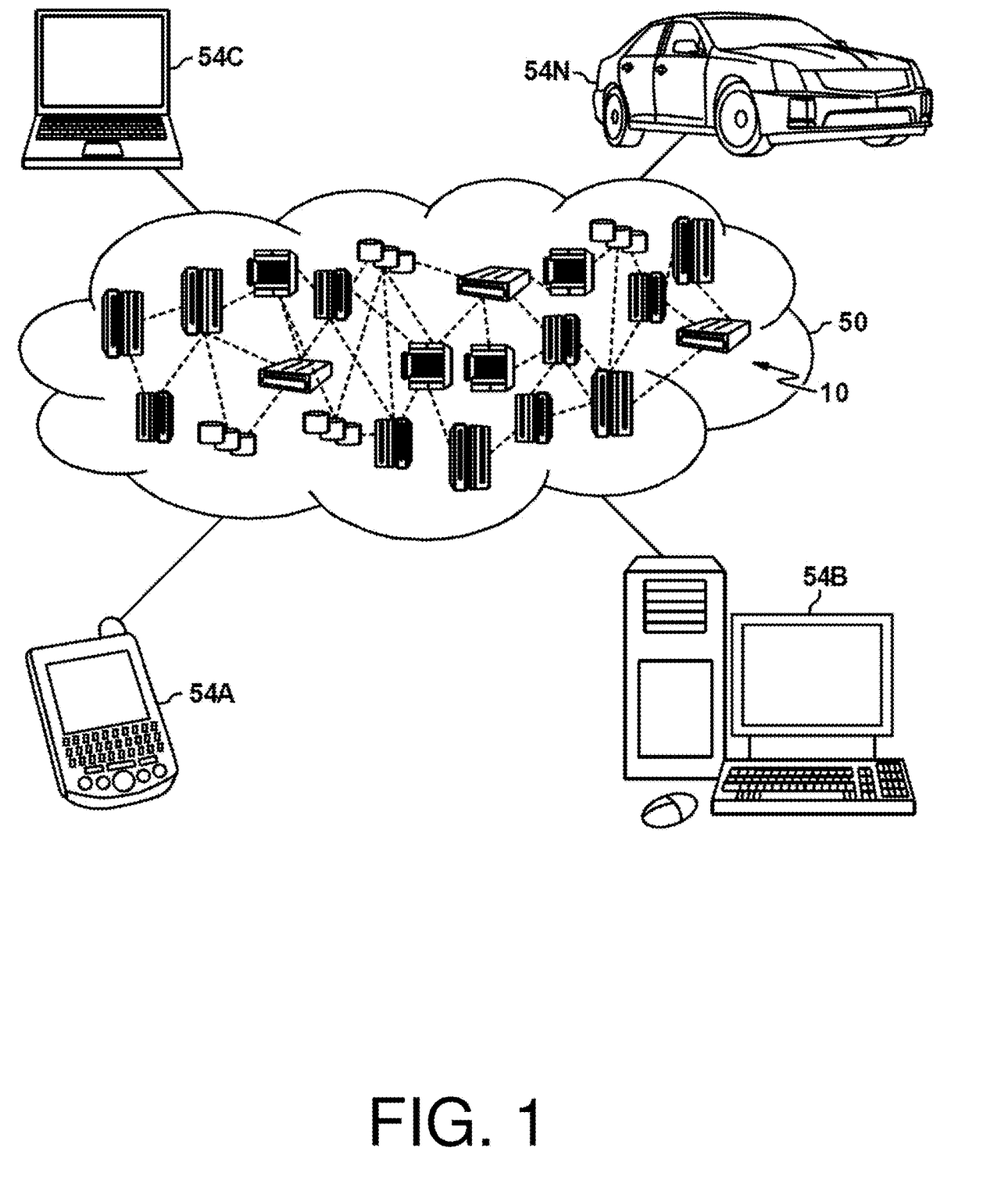
FIG. 1 depicts a cloud computing environment in accordance with one or more embodiments.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
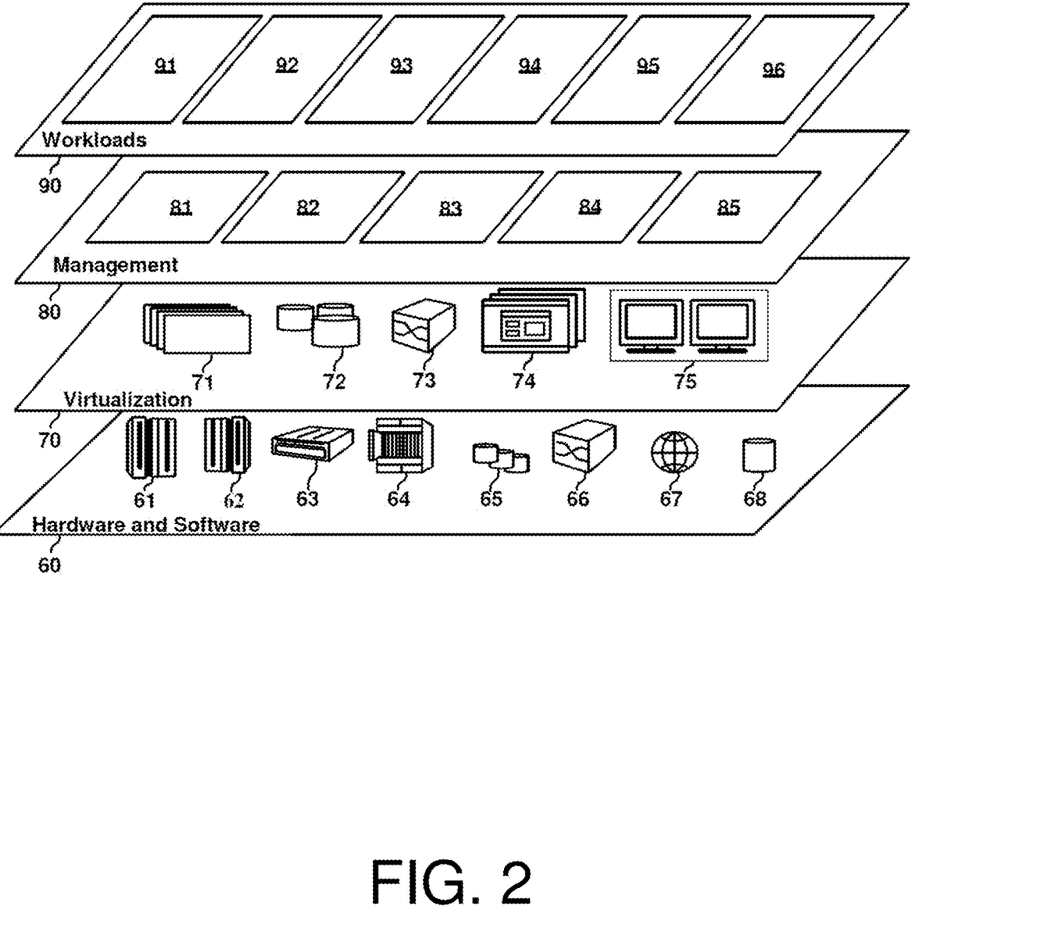
FIG. 2 depicts abstraction model layers in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visual hazard avoidance mechanism 96.

Figure 3:
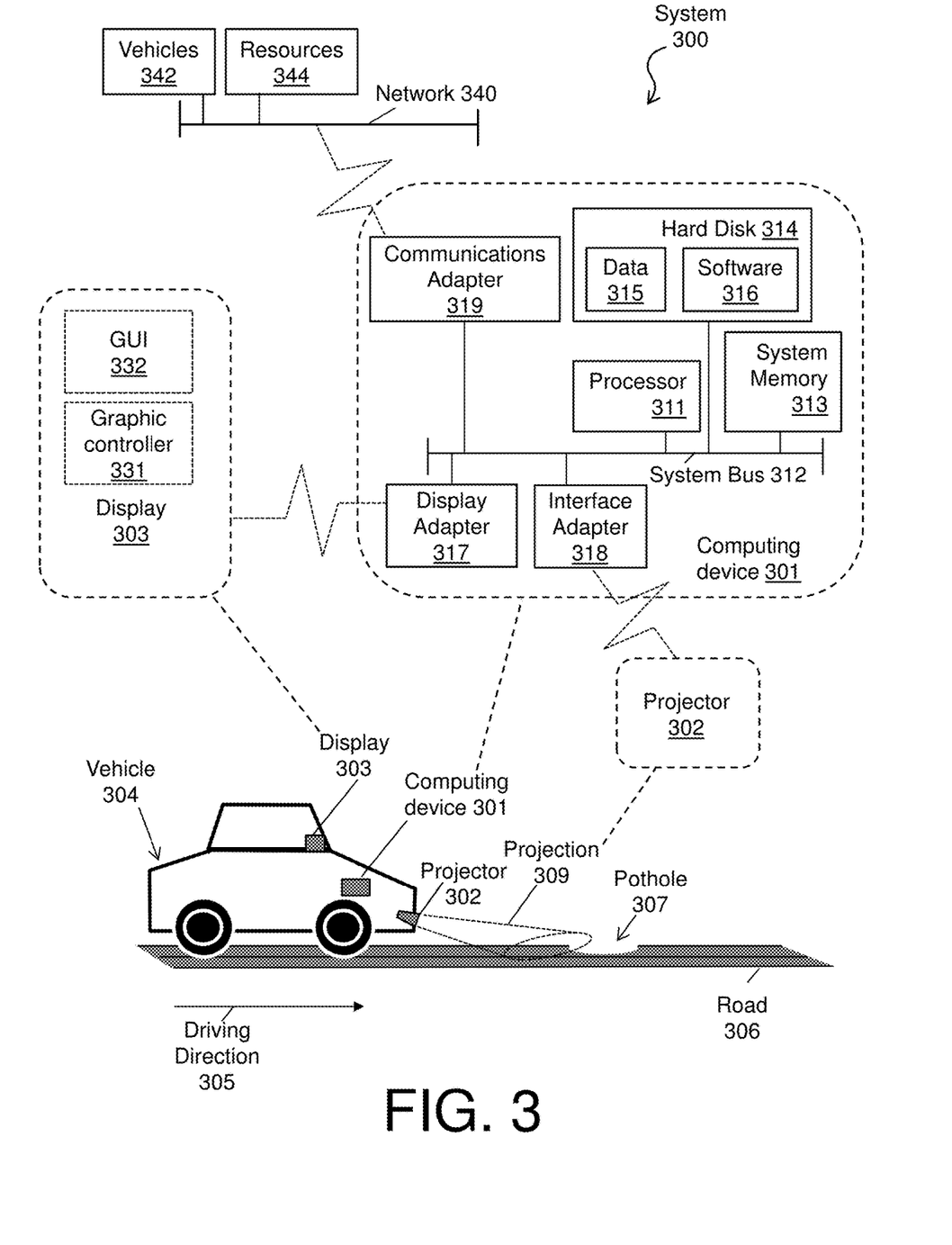
FIG. 3 depicts a system in accordance with one or more embodiments.

Turning now to FIG. 3, a system 300 is provided in accordance with one or more embodiments. As shown in FIG. 3, the system 300 can be an on-road projection system, as described herein, and includes a computing device 301 and a projector 302, along with an optional display 303. The system 300 can be integrated with a vehicle 304 heading in a driving direction 305 on a road 306 that includes at least one pothole 307 (which represents road hazard in general). The system 300 interacts with the road 306 by providing a projection 309 from the projector 302 with respect to at least one pothole 307.

The on-road projection system 300 can be an electronic, computer framework comprising and/or employing any number and combination of computing devices and networks utilizing various communication technologies, as described herein. The on-road projection system 300 can be easily scalable, extensible, and modular, with the ability to change to different services or reconfigure some features independently of others.

The computing device 301 has a processor 311, which can include one or more central processing units (CPUs), and can be considered an on-board computer for the vehicle 304. The processor 311, also referred to as a processing circuit, microprocessor, computing unit, is coupled via a system bus 312 to a system memory 313 and various other components. The system memory 313 can include read only memory (ROM) and random access memory (RAM).

The computing device 301 includes a hard disk 314, which is an example of a tangible storage medium readable executable by the processor 311. The hard disk 314 stores software 316 and data 315. The software 316 is stored as instructions for execution on the system 300 by the processor 311 (to perform process, such as the process flows of FIGS. 4 and 8). The data 315 includes a set of values of qualitative or quantitative variables organized in various data structures to support and be used by operations of the software 316. Examples of the data 315 include road hazard information including a list of hazards, such as potholes, uneven pavement, and the like, on roads, along with location, size, depth, direction, and lane information with respect each hazard on the list. The location of a road hazard can be determined based on global positioning information entered manually by a driver into the system 300 or automatically by the computing device 301 via detection.

The computing device 301 includes one or more adapters (e.g., hard disk controllers, network adapters, graphics adapters, etc.) that interconnect and support communications between the processor 311, the system memory 313, the hard disk 314, and other components of the system 300 (e.g., peripheral and external devices). As shown, the computing device 301 includes a display adapter 317, an interface adapter 318, and a communications adapter 319.

The display adapter 317 interconnects and communicatively couples the system bus 312 to the display 303, which can further include a graphics controller 331 to provide graphics performance, such as a display and management of a graphics user interface (GUI) 332. In accordance with one or more embodiments, the display 303 can provide the GUI 332 through a dashboard of the vehicle 304 and/or as a heads-up display on a windshield of the vehicle 304.

The interface adapter 318 interconnects and communicatively couples the system bus 312 to the projector 302, along with any user interfaces, sensors, speakers, and microphones of the vehicle 304. The projector 302 can be any optical device that projects an image (or moving images) onto a surface. The projector 302 can create an image (e.g., the projection 309) by shining a light through a small transparent lens or by projecting an image directly using lasers. The projector 302 can be connected into the vehicle's electronics system to receive/gain power. In this regard, the projector 302 can be activated using a button (e.g., an attachable remote button) inside the vehicle 304 that is accessible by the driver. In accordance with one or more embodiments, the projector 302 can represent one or more laser pointer projectors that are attached/fixed/inserted to a front of the vehicle 304 and aligned with the front tires.

For example, two laser pointer projectors positioned on a front side of the vehicle 304 and facing the driving direction 305. Each of the two laser pointer projectors can be aligned with one of the front tires of the vehicle 304. The two laser pointer projectors face in the driving direction 305 to provide corresponding instances of the projection 309 onto the road 306 at a distance in front of the vehicle 304 that a driver can see. The corresponding instances of the projection 309 and angles thereof can be adjusted based on each vehicle credentials, such as a vehicle height, a physical vehicle configuration, etc. The shape of the corresponding instances of the projection 309 can at least include a width or diameter that is as wide as the tires of the vehicles. Further, in accordance with one or more embodiments, the sensors connected to the interface adapter 318 can include one or more accelerometers, which provide data to the computing device 301 with respect to speed and acceleration. In turn, the projections 309 and angles thereof can also be adjusted based on vehicle speed, weather condition, road information, etc. In this regard, the two laser pointer projectors always make the projections 309 visible on the road 306 to the driver by moving the projections 309 back and forth depending on how the vehicle 304 is moving (to give an accurate approximation of where the tires of the vehicle 304 will be once the pothole 307 is encountered). Note that a technical effect and benefit of the system 300, therefore, includes when a driver is unsure where the tires are or know how to accurately estimate tire position, enabling the drive to look out a vehicle windshield while in-motion and in real-time to see the projections 309 and make driving corrections to avoid the pothole 307. Further, additional laser pointer projectors can be positioned throughout the vehicle 304, such as to inform a driver a height of a truck in relation to an overpass or bridge (so that the driver can manipulate the vehicle 304 before causing damage).

The communications adapter 319 interconnects and communicatively couples the system bus 312 to a network 340 enabling the system 300 to communicate with one or more other vehicle 342 and/or other resources 344 (e.g., systems, devices, data, and software).

In one or more embodiments, the operations of the software 316 and the data 315 can be implemented on the network 340 by a server and a database of the resources 344. For instance, the network 340, the server, and the database can combine to provide internal iterations of the software 316 and the data 315 as a platform as a service, a software as a service, and/or infrastructure as a service (e.g., as a web application in a distributed system) via a cellular connection. Thus, as configured in FIG. 3, the operations of the software 316 and the data 315 (e.g., the system 300) are necessarily rooted in the computational ability of the processor 311, the projector 302, the graphics controller 331, and/or the resources 344 to overcome and address the herein-described shortcomings of the realm of vehicle maintenance and repair. In this regard, the software 316 and the data 315 improve computational operations of the processor 311, the projector 302, the graphics controller 331, and/or the resources 344 of the system 300 by providing real-time information to drivers to enable drivers to avoid these road hazards (thereby reducing costs associated with vehicle maintenance and repair). For instance, by avoiding road hazards, jolting and moderate to high impact wear and tear on components of the vehicle 304 are also avoided. With less wear and tear on the components of the vehicle 304, vehicle maintenance and repair with respect to these components is reduced.

Figure 4:
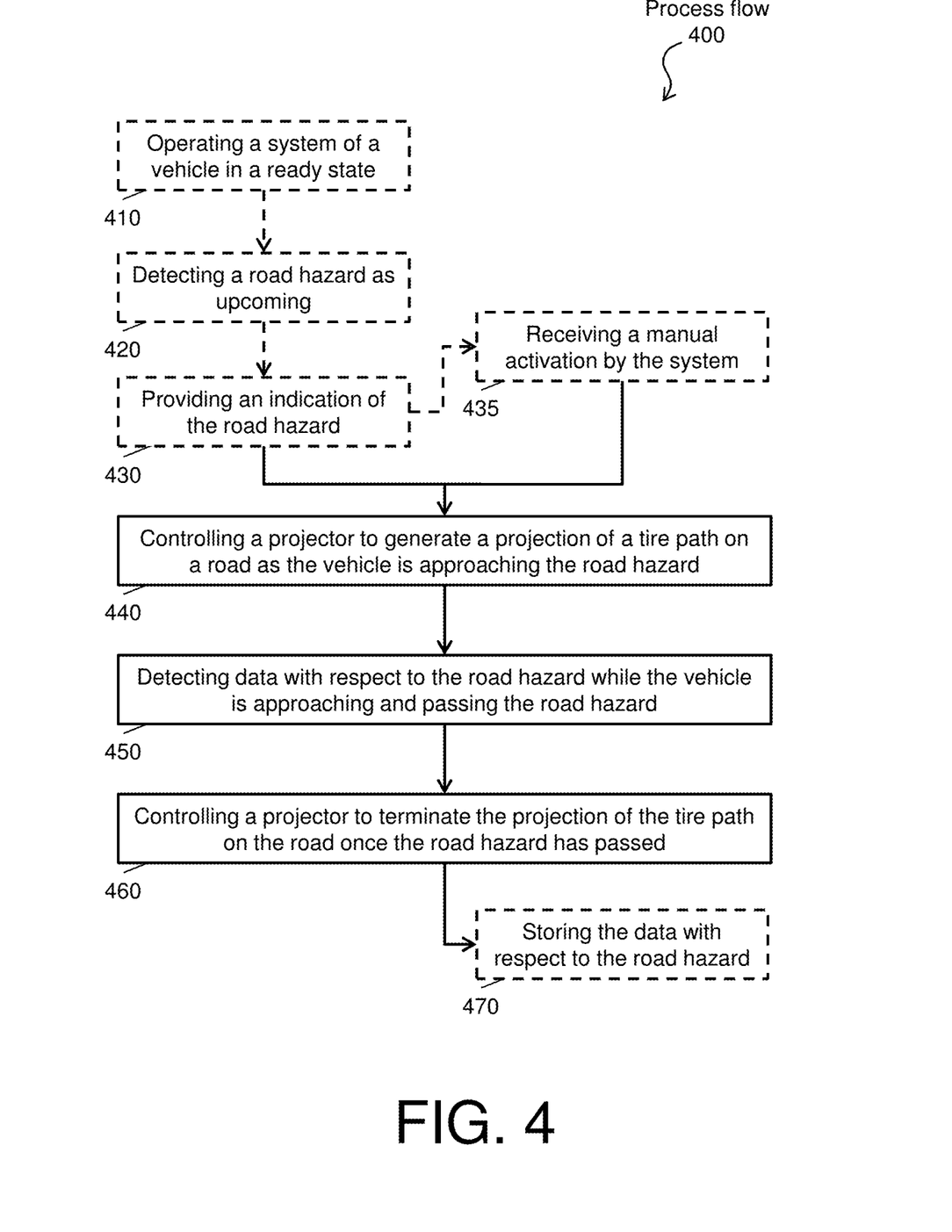
FIG. 4 depicts a process flow of a system in accordance with one or more embodiments.

FIG. 4 depicts a process flow 400 of the system 300 of FIG. 3 in accordance with one or more embodiments. More particularly, the process flow 400 is an example method for a visual hazard avoidance of a road hazard by an on-road projection system (e.g., the system 300) integrated into the vehicle 304. The system 300 implements the process flow 400 while the vehicle 304 is in motion.

The process flow 400 being at dashed block 410, where the system 300 operates in a ready state. The ready state is a mode of the system 300 where it is prepared to detect and/or identify road hazards by manual and/or automatic command while the projector 302 is not activated.

At dashed block 420, the system 300 detects the road hazard as upcoming. The detection of the road hazard can be based on a current location and direction of the vehicle 304. For example, the detection can be a real-time operation that identifies the road hazard when the vehicle is a predetermined distance away. The predetermined distance away can be a fixed distance or can be based on the speed of the vehicle. For example, the computing device 301 can store a table that associates speed with distance, such that a vehicle 304 traveling at a first speed identifies the road hazard at 250 meters and at a second speed identifies the road hazard at 500 meters.

At dashed block 430, the system 300 generates an indication of the road hazard as the vehicle 304 is approaching the road hazard. For instance, once the vehicle 304 is less than the predetermined distance away, the display 303 provides the indication of the road hazard. The indication can be an auditory and/or visual signal to the driver that the vehicle 304 is within the predetermined distance of the road hazard. The auditory and/or visual signal can be accompanied with additional projection data that complements the projection 309. The additional projection data can include information on the size of the road hazard, a countdown on the distance to the road hazard, and course correction to avoid the road hazard. Next the process flow 400 can proceed to dashed block 435 or directly to block 440.

At dashed block 435, the system 300 receives a manual activation. In this regard, the projector 302 can be manually activated using a button inside the vehicle 304 that is accessible by the driver. In turn, the projector 302 is always on. This scenario may be ideal for extreme weather condition while the vehicle 304 is in motion.

Note that dashed blocks 410, 420, 430, and 435 are optional based on setting of the system 300. In this regard, the system 300 can be preprogrammed to automatically turn on (follow the block path of 410, 420, 435), can be manually activated (and follow only block path 435), or follow a combination thereof.

At block 440, the computing device 301 controls the projector 302 to generate the projection 309 on the road 306 as the vehicle 304 is approaching the road hazard (e.g., the pothole 307). The projection 309 identifies a tire path of the vehicle 304. The computing device 301 can control the projector 302 to alter an angle of the projection based on vehicle speed. For instance, the faster the vehicle 304 is traveling, the father the projection 309 is placed in front of the vehicle 304.

At block 450, the detecting data with respect to the road hazard while the vehicle 304 is approaching and passing the road hazard. At block 460, the computing device 301 controls the projector 302 to terminate the projection on the road once the road hazard in passed. At block 470, the computing device 301 stores the data (as data 315) with respect to the road hazard.

Figure 5:
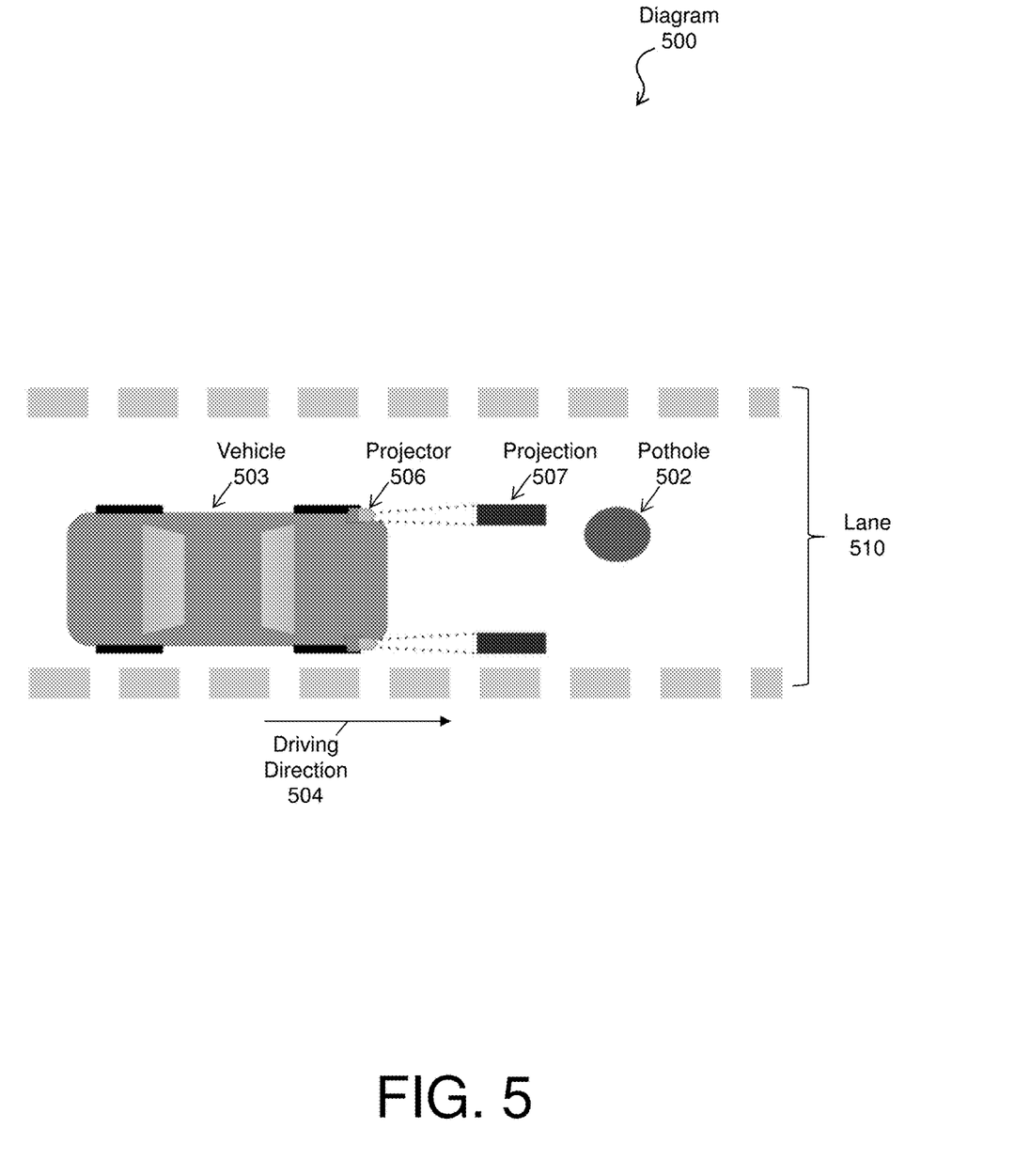
FIG. 5 depicts a diagram of an operating scenario for a system in accordance with one or more embodiments.
Figure 6:
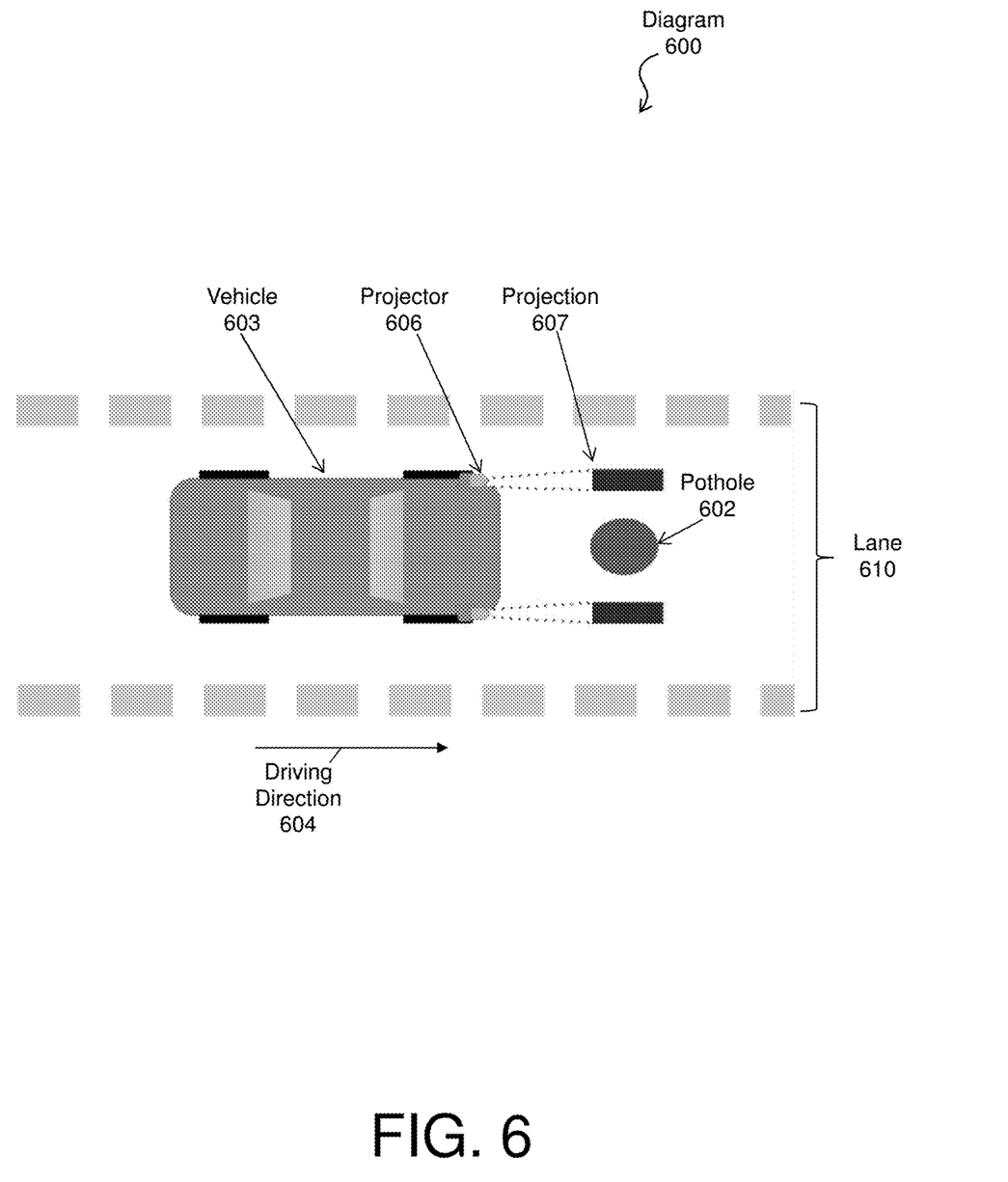
FIG. 6 depicts a diagram of an operating scenario for a system in accordance with one or more embodiments.
Figure 7:
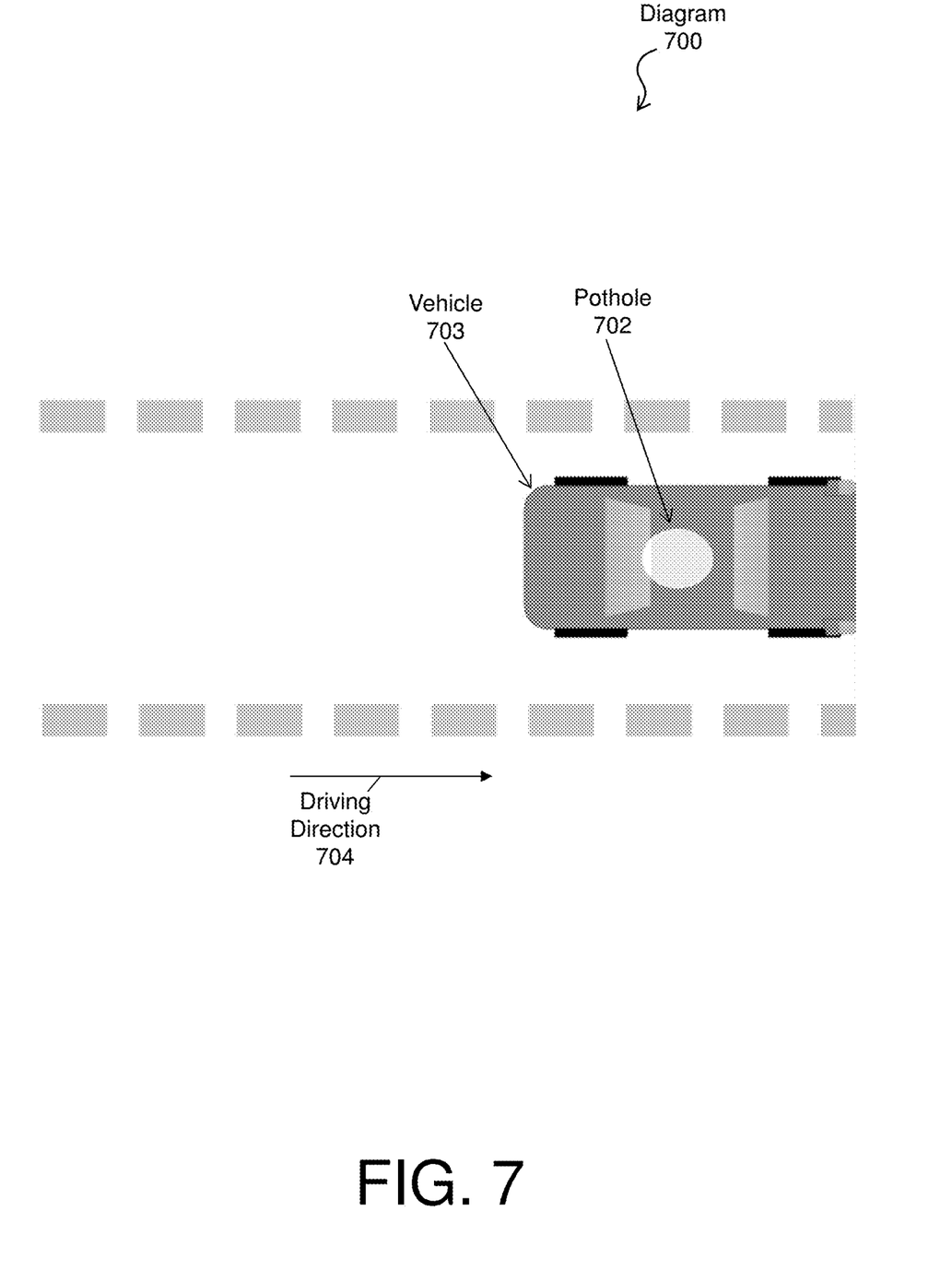
FIG. 7 depicts a diagram of an operating scenario for a system in accordance with one or more embodiments.

Example operating scenarios are examined with respect to FIGS. 5-7 to illustrate the on-road projection system described herein.

FIG. 5 depicts a diagram 500 of a first stage operating scenario for the on-road projection system in accordance with one or more embodiments. As shown by the diagram, the pothole 502 is being approached by a moving vehicle 503, which is traveling in a driving direction 504. Further, projectors 506 are generating projections 507 in front of the vehicle 503. Utilizing the projections 507, a driver of the vehicle determines that the pothole 502 is aligned with a tire path of the front left tire of the vehicle. Note that the vehicle has maneuverability within the lane 510. In turn, the driver adjusts the course of the vehicle to the left of the lane 510.

FIG. 6 depicts a diagram 600 of a second stage operating scenario for the on-road projection system in accordance with one or more embodiments. The second stage operating scenario is a moment after the course adjustment is performed by the driver. As shown by the diagram, the pothole 602 is being approached by a moving vehicle 603, which is traveling in a driving direction 604. Further, projectors 606 are generating projections 607 in front of the vehicle 603. Utilizing the projections 607, the driver of the vehicle determines that the pothole 602 is no longer aligned with the tire path of the front left tire of the vehicle. Note that the vehicle is now more centered in the lane 610.

FIG. 7 depicts a diagram 700 of a third stage operating scenario for the on-road projection system in accordance with one or more embodiments. The second stage operating scenario is a moment after the pothole 702 has passed the front of the vehicle 703. As shown by the diagram, projections no projection are being generated in front of the vehicle 703 in the driving direction 704.

Figure 8:
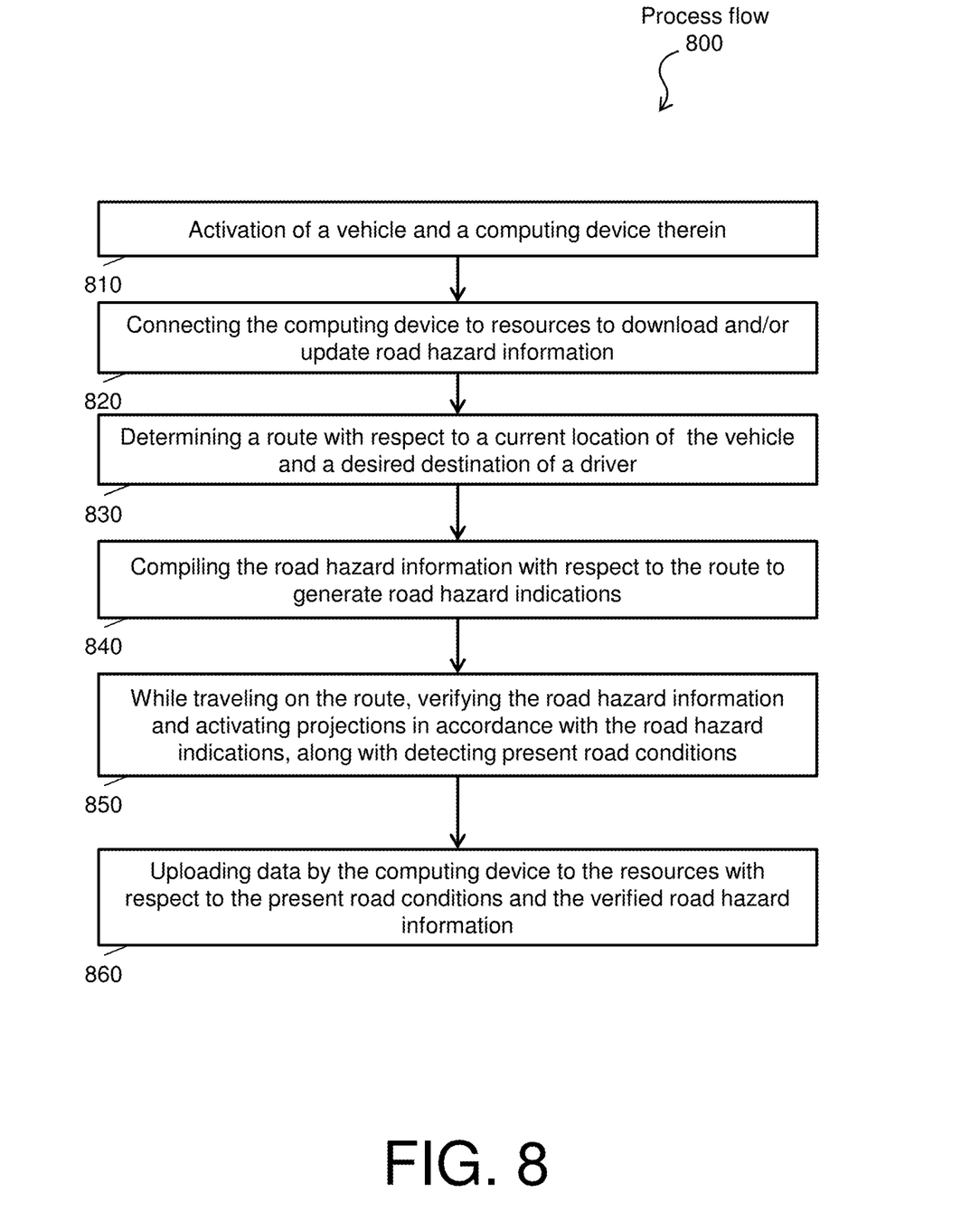
FIG. 8 depicts a process flow of a system in accordance with one or more embodiments.

FIG. 8 depicts a process flow 800 of a system 300 of FIG. 3 in accordance with one or more embodiments. The process flow begins at block 810, where an activation of the vehicle 304 and the computing device 301 therein occurs. This activation can include the starting of the vehicle 304 by key or by remote command. In turn, power is passed to the system 300, and the computing device 301 and the projector 302 are turned on.

At block 820, the computing device 301 connects to the resources 344, via the communications adapter 319 and the network 340, to download and/or update road hazard information. The road hazard information can be stored as data 315 on the computing device 301. The road hazard information can comprise a list of hazards, such as potholes, uneven pavement, and the like, on roads within a geographic area of the vehicle 304 (e.g., such as within 50 miles). The road hazard information can also comprise location, size, depth, direction, and lane information with respect to each hazard on the list.

At block 830, the system 300 determines a route with respect to a current location of the vehicle and the desired destination of a driver. The computing device 301 itself or another computing component of the system 300 can determine the route. The route can be calculated by wayfinding software (e.g., software 316) that accounts for traffic, available roads, and estimated speed. The current location of the vehicle can be a global position or address of the vehicle at the time of activation (see block 810). The desired destination can be an address or point of interest entered by the user or predetermined by other means (address of an appointment).

At block 840, the system 300 compiles the road hazard information with respect to the route to generate road hazard indications. The system can us additional sensors connected to the interface adapter 318, such as laser sensors or image sensors, to determine or verify the road hazard as it passes under the vehicle 304.

At block 850, while traveling on the route, verifying the road hazard information and activating projections in accordance with the road hazard indications, along with detecting present road conditions. The system 300, for instance, can perform an operation similar to the process flow 400 of FIG. 4.

At block 860, the computing device 301 uploads data to the resources 344, via the communications adapter 319 and the network 340, with respect to the present road conditions and the verified road hazard information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for visual hazard avoidance of a road hazard by an on-road projection system integrated into a vehicle, the on-road projection system comprising a projector, a display, and a computing device, the on-road projection system implementing the method while the vehicle is in motion, the method comprising:
   compiling, by the computing device, road hazard information including the road hazard with respect to a route;
   controlling, by the computing device, the projector to generate a projection on a road as the vehicle is approaching the road hazard, the projection identifying a tire path of the vehicle by projecting an image onto a surface of the road at the road hazard to provide visual feedback of tire position parallel to a direction of travel of the vehicle relative to the road hazard, wherein the image comprises an image of tire position parallel to the direction of travel of the vehicle;
   controlling, by the computing device, the projector to terminate the projection on the road once the road hazard in passed;
   generating an indication of the road hazard as the vehicle is approaching the road hazard; and
   providing, by the display, the indication of the road hazard, along with additional projection data that complements the projection.

2. The method of claim 1, the method further comprising:
  detecting the road hazard as an upcoming pothole based on a current location and direction of the vehicle.

3. The method of claim 1, the method further comprising:
  detecting data with respect to the road hazard while the vehicle is approaching and passing the road hazard.

4. The method of claim 1, wherein the projector comprises one or more laser pointer projectors positioned on a front side of the vehicle and facing a driving direction, each of the one or more laser pointer projectors being aligned with a tire of the vehicle, and each of the one or more laser pointer projectors generating a corresponding projection indicating a path of that tire onto the road at a distance in front of the vehicle that a driver can see at only opposite sides of the road hazard respectively corresponding to left- and right-sides of the vehicle.

5. The method of claim 1, wherein the computing device controls the projector to alter an angle of the projection based on vehicle speed.

6. An on-road projection system for visual hazard avoidance of a road hazard, the on-road projection system being integrated into a vehicle, the on-road projection system implementing the visual hazard avoidance while the vehicle is in motion, the on-road projection system comprising:
  a projector generating a projection that identifies a tire path of the vehicle;
  a display; and
  a computing device controlling the projector to compile road hazard information including the road hazard with respect to a route, generate the projection on the road as the vehicle is approaching the road hazard by projecting an image onto a surface of the road at he road hazard to provide visual feedback of tire position parallel to a direction of travel of the vehicle, wherein the image comprises an image of tire position parallel to the direction of travel of the vehicle relative to the road hazard and to terminate the projection on the road once the road hazard in passed, and generate an indication of the road hazard as the vehicle is approaching the road hazard,
  wherein the display for provides the indication of the road hazard, along with additional projection data that complements the projection.

7. The on-road projection system of claim 6, wherein the on-road projection system is configured to detect the road hazard as an upcoming pothole based on a current location and direction of the vehicle.

8. The on-road projection system of claim 6, wherein the on-road projection system is configured to detect data with respect to the road hazard while the vehicle is approaching and passing the road hazard.

9. The on-road projection system of claim 6, wherein the projector comprises one or more laser pointer projectors positioned on a front side of the vehicle and facing a driving direction, each of the one or more laser pointer projectors being aligned with a tire of the vehicle, and each of the one or more laser pointer projectors generating a corresponding projection indicating a path of that tire onto the road at a distance in front of the vehicle that a driver can see at only opposite sides of the road hazard respectively corresponding to left- and right-sides of the vehicle.

10. The on-road projection system of claim 6, wherein the computing device controls the projector to alter an angle of the projection based on vehicle speed.

11. A computer program product for visual hazard avoidance of a road hazard, the computer program product executable by an on-road projection system integrated into a vehicle, the on-road projection system comprising a projector, a display, and a computing device, the on-road projection system implementing the visual hazard avoidance while the vehicle is in motion, the computer program product executable by the on-road projection system to cause:
  compiling, by the computing device, road hazard information including the road hazard with respect to a route;
  controlling, by the computing device, the projector to generate a projection on a road as the vehicle is approaching the road hazard, the projection identifying a tire path of the vehicle by projecting an image onto a surface of the road at the road hazard to provide visual feedback of tire position parallel to a direction of travel of the vehicle relative to the road hazard, wherein the image comprises an image of tire position parallel to the direction of travel of the vehicle; and
  controlling, by the computing device, the projector to terminate the projection on the road once the road hazard in passed;
  generating an indication of the road hazard as the vehicle is approaching the road hazard; and
  providing, by the display, the indication of the road hazard, along with additional projection data that complements the projection.

12. The computer program product of claim 11, the computer program product executable by the on-road projection system to cause:
  detecting the road hazard as an upcoming pothole based on a current location and direction of the vehicle.

13. The computer program product of claim 11, the computer program product executable by the on-road projection system to cause:
  detecting data with respect to the road hazard while the vehicle is approaching and passing the road hazard.

14. The computer program product of claim 11, wherein the projector comprises one or more laser pointer projectors positioned on a front side of the vehicle and facing a driving direction, each of the one or more laser pointer projectors being aligned with a tire of the vehicle, and each of the one or more laser pointer projectors generating a corresponding projection indicating a path of that tire onto the road at a distance in front of the vehicle that a driver can see at only opposite sides of the road hazard respectively corresponding to left- and right-sides of the vehicle.

15. The computer program product of claim 11, wherein the computing device controls the projector to alter an angle of the projection based on vehicle speed.

16. The method of claim 5, wherein as the vehicle speed increases, the projection is provided at a greater a distance front of the vehicle.

17. The method of claim 2, wherein the detection is a real-time operation that identifies the road hazard when the vehicle is a predetermined distance away, the predetermined distance away being a fixed distance or based on vehicle speed.

* * * * *